United States Patent [19]
Nemoto et al.

[11] Patent Number: 5,170,351
[45] Date of Patent: Dec. 8, 1992

[54] AUTOMATIC GUIDED VEHICLE AND METHOD FOR CONTROLLING TRAVEL THEREOF

[75] Inventors: Toshikazu Nemoto, Katano; Yoshihiro Matsumoto, Kadoma, both of Japan

[73] Assignee: Matsushita Electric Industrial Co., Ltd., Osaka, Japan

[21] Appl. No.: 584,578

[22] Filed: Sep. 18, 1990

[51] Int. Cl.$^5$ .............................................. G06F 15/50
[52] U.S. Cl. ................................ 364/424.02; 180/169; 318/568.12
[58] Field of Search ...................... 364/424.02, 426.04; 180/167, 168, 169; 318/568.12

[56] References Cited

U.S. PATENT DOCUMENTS

| | | | |
|---|---|---|---|
| 4,621,705 | 11/1986 | Etoh | 180/169 |
| 4,622,636 | 11/1986 | Tahibana | 364/424.02 |
| 4,829,442 | 5/1989 | Kadonoff et al. | 364/449 |
| 4,875,172 | 10/1989 | Kanayama | 364/513 |
| 4,954,962 | 9/1990 | Evan, Jr. et al. | 364/513 |
| 4,982,329 | 1/1991 | Tabata et al. | 364/424.02 |
| 5,001,635 | 3/1991 | Yasutomi et al. | 364/424.02 |
| 5,036,935 | 8/1991 | Kohara | 180/168 |

OTHER PUBLICATIONS

Belohoubek, "Radar Control for Automotive Collision Mitigation and Headway Spacing", 1982, IEEE Transactions on Vehicular Technology, vol. VT-31, No. 2 (May 1982).

*Primary Examiner*—Thomas G. Black
*Attorney, Agent, or Firm*—Wenderoth, Lind & Ponack

[57] ABSTRACT

An automatic guided vehicle has a detector for detecting a distance between the vehicle and an object and then outputting a distance signal, and a controller for controlling the speed of the vehicle according to the distance signal and for operating in one of a succeeding vehicle mode under which the distance between the vehicle and a preceding automatic guided vehicle is small and a preceding vehicle mode under which the distance maintained therebetween will be larger. A travel control method for controlling a travel of the automatic guided vehicle includes the steps of: dividing an entire travel path into sections, and operating the vehicle in one of the modes in each section. The succeeding vehicle mode allows the vehicle to travel in a group with a small distance between the vehicle and the preceding vehicle, and the preceding vehicle mode allows a group of the vehicles to be disorganized and the vehicles to travel at a predetermined speed so that the distance therebetween is larger.

2 Claims, 5 Drawing Sheets

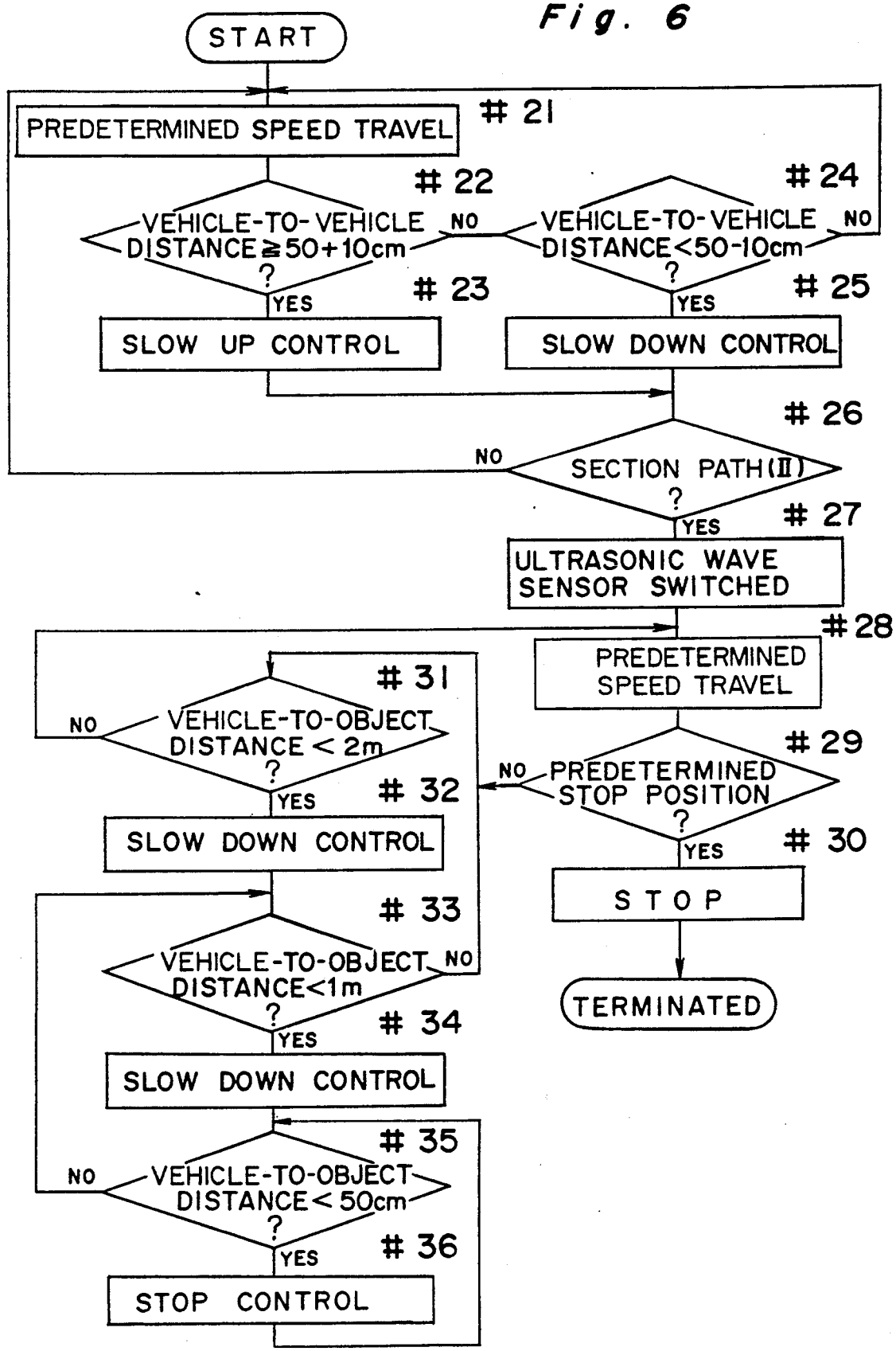

AUTOMATIC GUIDED VEHICLE AND METHOD FOR CONTROLLING TRAVEL THEREOF

BACKGROUND OF THE INVENTION

The present invention relates to an automatic guided vehicle for carrying goods along a predetermined travel path and a method for controlling the travel of the automatic guided vehicle.

A conventional automatic guided vehicle travels along a predetermined travel path while a means for detecting the distance between the vehicle and an object detects whether or not an object is present approximately 2 m forward of the vehicle. If no object is detected, the vehicle travels at a predetermined speed of approximately 60 m/min. If any object is detected, the vehicle speed is reduced or the vehicle is stopped.

According to the known control program for controlling the travel of a plurality of vehicles along travel paths leading to a plurality of start places and destinations, each automatic guided vehicle starts from its start place and travels along a common travel path until it arrives at its destination.

According to such a control method, when many automatic guided vehicles travel along the travel path, the vehicles travel as chained together with a distance between adjacent vehicles of approximately 2 m. Accordingly, the number of vehicles which can travel along the entire path is small.

Additionally, when a person walks across the travel path with the vehicle chained together as described above, an automatic guided vehicle travelling at the head of the vehicles immediately detects the person, thus reducing its speed or stopping. Consequently, succeeding vehicles sequentially reduce their speed or stop. Therefore, when the head vehicle increases its speed or starts up to a predetermined speed, it takes much time for all vehicles to increase the speeds thereof up to the predetermined speeds or to start. Thus, it is difficult for vehicles to travel smoothly.

SUMMARY OF THE INVENTION

Accordingly, an essential object of the present invention is to provide an automatic guided vehicle which can travel in large numbers in a first mode along a travel path and which, in a second mode, can maintain an interval between a person which will allow that person to cross the path without the preventing vehicles from travelling smoothly.

Another important object of the present invention is to provide a travel control method for improving the efficiency under which the vehicles travel as guided automatically in a group or individually along a travel path.

In accomplishing these and other objects, according to one aspect of the present invention, an automatic guided vehicle comprises: detecting means for detecting a distance between the vehicle and an object and then outputting a distance signal; and control means for controlling the speed of the vehicle according to the distance signal, and for selectively operating in a succeeding (first) vehicle mode under which the distance between the vehicle and a preceding automatic guided vehicle will be small and a preceding vehicle (second) mode under which the distance therebetween will be greater.

According to another aspect of the present invention, there is provided a method for controlling the travel of an automatic guided vehicle having detecting means for detecting a distance between the vehicle and an object and then outputting a distance signal; and control means for controlling the speed of the vehicle according to the distance signal, and for selectively operating in a succeeding vehicle (first) mode under which the distance between the vehicle and a preceding automatic guided vehicle will be small and a preceding vehicle (second) mode under which the distance therebetween will be larger, the method comprising the steps of: dividing a travel path into sections; and operating the vehicle in one of the modes in each travel section; whereby operating the vehicle in the succeeding vehicle mode allows a plurality of the vehicles to travel in a group with a small distance between each vehicle and the preceding vehicle, and operating the vehicles in the preceding vehicle mode allows the group of vehicles to be disorganized and the vehicles to travel at a predetermined speed with the distance therebetween being larger.

According to the automatic guided vehicle of the present invention, the number of vehicles which travel along a travel path can be increased by reducing the distance between each vehicle and the preceding automatic guided vehicle by operating the vehicles in the succeeding vehicle mode.

When the number of vehicles in each of a plurality of groups thereof is almost the same, a lead vehicle in a trailing group can be operated in the preceding vehicle mode so as to provide an interval between adjacent groups of the vehicles sufficient to allow a person to cross therebetween. Therefore, it is unnecessary to reduce the speed of the vehicles or stop them when a person crosses the path of the vehicles, and thus the vehicle can travel smoothly.

According to the control method for controlling the travel of the vehicles, each vehicle is operated under the preceding vehicle mode or the succeeding vehicle mode for each section of a travel path. Therefore, a group of vehicles can be organized or disorganized, or a certain automatic guided vehicle can be separated from a group of vehicles at each section of the path.

A plurality of travel sections are established within the entire travel path by a point at which the vehicles which have started from different start places join a common path and branch points from the common path each leading to a destination. Thus, the vehicles which have started from various start places travel at a reduced vehicle-to-vehicle distance in the common section of the path. Thereafter, when a certain automatic guided vehicle arrives at a branch point, the vehicle is separated from other automatic guided vehicles, thereby going to the destination. Thus, the travel efficiency of each vehicle can be improved.

BRIEF DESCRIPTION OF THE DRAWINGS

These and other objects and features of the present invention will become clear from the following description taken in conjunction with the preferred embodiments thereof with reference to the accompanying drawings, in which:

FIG. 6 is a flow chart of the control procedure to be executed by the control section of a vehicle "b" when it travels along first and second sections of a travel path.

DETAILED DESCRIPTION OF THE INVENTION

Figure 1:
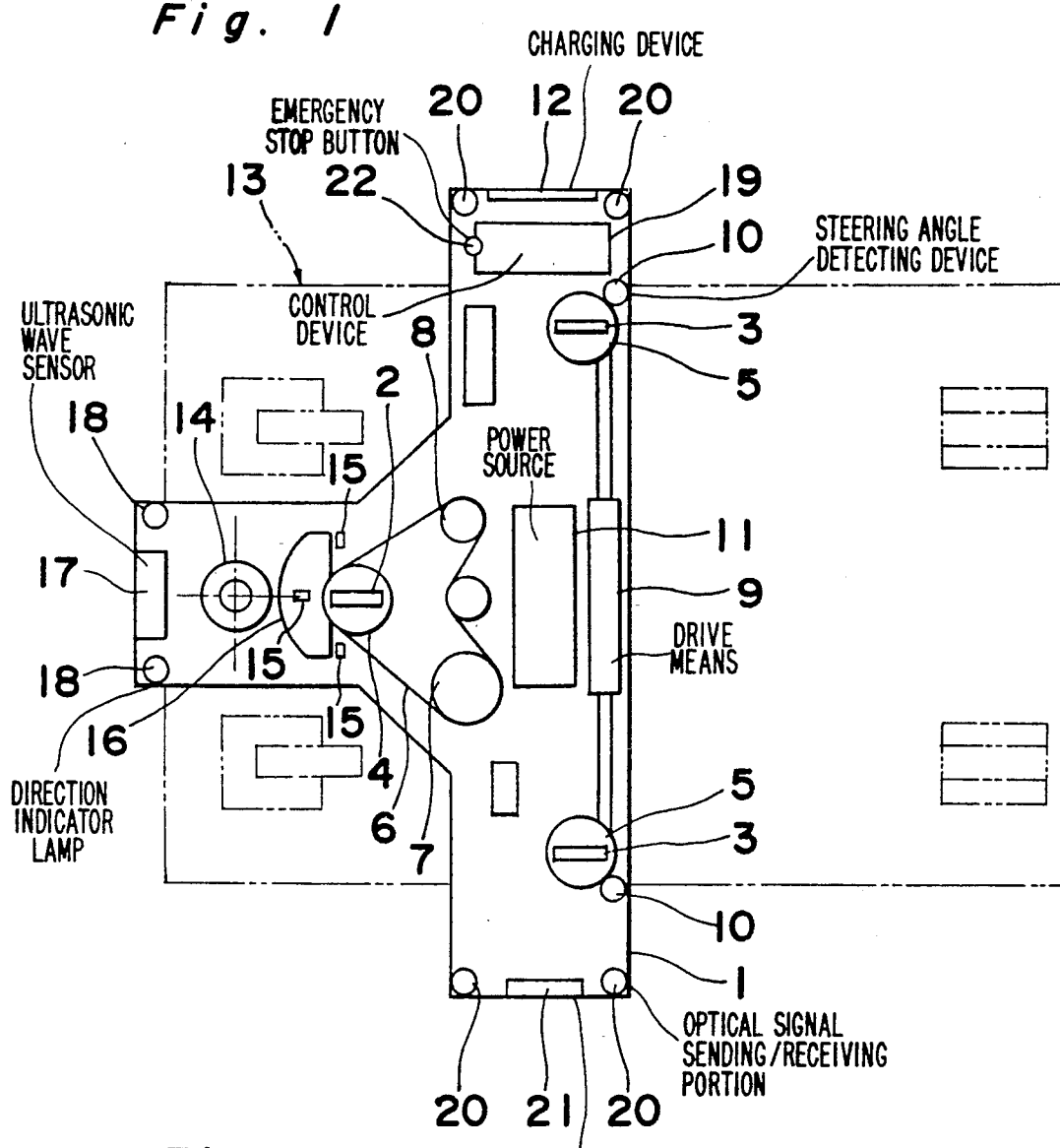
FIG. 1 is a plan view of an automatic guided vehicle according to an embodiment of the present invention.

Before the description of the present invention proceeds, it is to be noted that like parts are designated by like reference numerals throughout the accompanying drawings.

Figure 2:
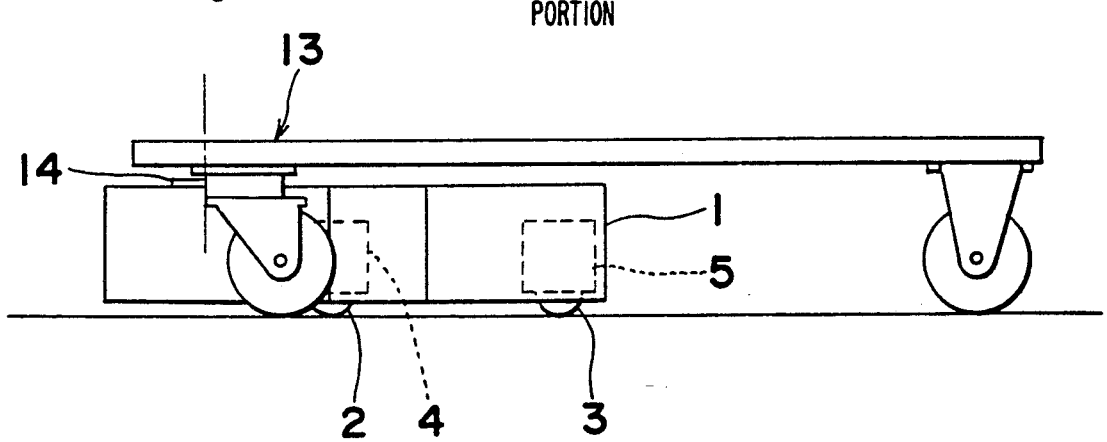
FIG. 2 is a side elevational view of the automatic guided vehicle of FIG. 1.
Figure 3:
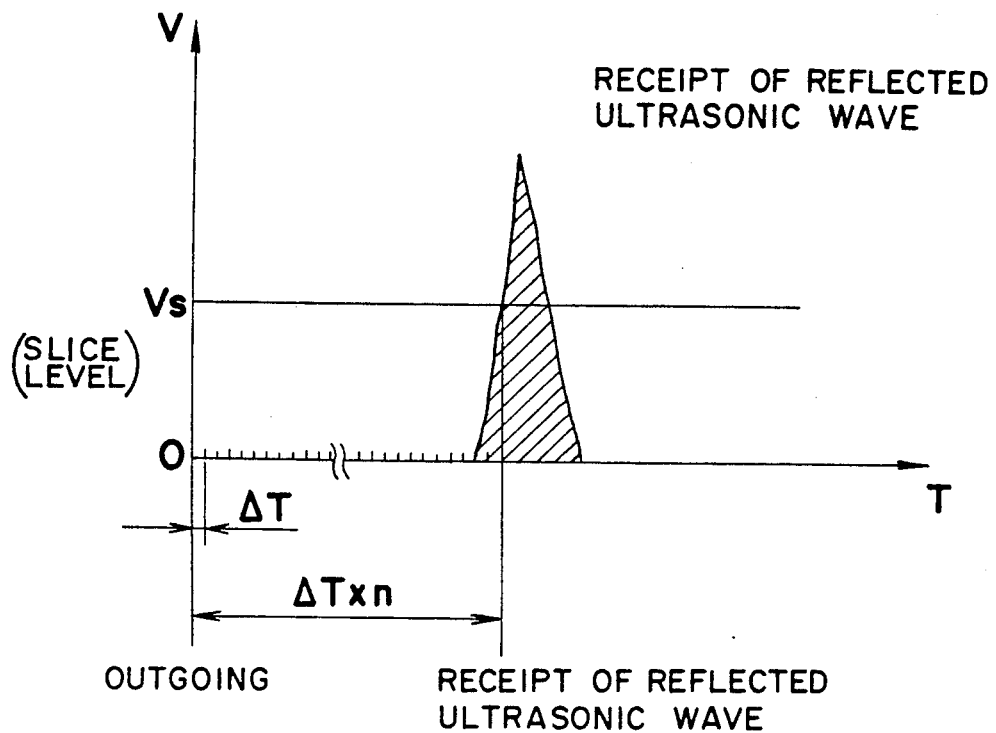
FIG. 3 is a graph showing the condition in which an ultrasonic wave is outputted from an ultrasonic wave sensor of the automatic guided vehicle and is reflected by an object positioned in front of the vehicle.

An automatic guided vehicle according to an embodiment of the present invention will be described with reference to FIGS. 1 through 3.

On the underside of an inverted T-shaped vehicle body 1, a front wheel 2 and a pair of rear wheels 3 are supported by a bracket 4 and brackets 5, respectively. Each of the wheels 2 and 3 is rotatable about a horizontal shaft. The brackets 4 and 5 are each rotatably mounted on the body 1 about a vertical shaft. The front wheel 2 and the rear wheels 3 are each connected with a driving motor (not shown). The front wheel 2 is rotated about the vertical shaft by a front wheel steering drive pulley 7 through a timing belt 6 wound around the bracket 4. The timing belt 6 is wound around a front wheel steering angle detecting pulley 8 as well. Each bracket 5 supporting a rear wheel 3 is connected to one end of a pair of rods which are in turn connected to a rear wheel steering drive means 9. The brackets 5 are rotated about each vertical shaft through each rod reciprocatively mounted on the rear wheel steering drive means 9. A steering angle detecting device 10 is attached to each bracket 5. A power source 11 for supplying electric power to the driving motor is installed in the vicinity of the rear wheel steering drive means 9. A charging device 12 for charging the power source 11 is disposed on one side of the body 1.

There is provided forward of the front wheel 2 a coupling portion 14 for coupling the body 1 with a cart 13 carrying goods. Sensors 15 and a sensor 16 are positioned between the coupling portion 14 and the front wheel 2. The sensors 15 detect the position of the cart 13 when the body 1 is positioned under the cart 13. The sensor 16 detects a path along which the vehicle travels. There is provided in the front end portion of the body 1 an ultrasonic wave sensor 17 for detecting the distance between the body 1 and a preceding automatic guided vehicle or the distance between the body 1 and an object positioned forward thereof. Direction indicator lamps 18 are provided on both sides of the ultrasonic wave sensor 17.

A control device 19 for controlling devices of the body 1 is provided on one side thereof. The body 1 further has an optical signal sending/receiving portion 20 for optically communicating with an external control CPU 23 (refer to FIG. 4), a signal input portion 21 to be used when a manual remote control operation is performed, and an emergency stop button 22. The button 22 is used to suspend the travel of the vehicle and disorganize a group of vehicles.

According to the ultrasonic wave sensor 17 mounted on the body 1 at the front end portion thereof, a speaker receives an ultrasonic wave outputted from the sensor 17 and reflected by an object positioned in front of the body 1. The period of time from the output until the receipt of the wave is obtained by multiplying a cycle $\Delta T$ of the timer by the number (n) of samplings. A digital signal indicating the period of time is outputted to the control device 19. Therefore, the distance L from the body 1 to the object is calculated as follows:

$$L = \frac{Va \times \Delta T \times n}{2}$$

where Va is a sonic velocity.

In order to maintain the distance between vehicles, the number (n) of samplings is set as shown in the table below.

TABLE

| L(cm) | less than 4 | not less than 40 and less than 60 | not less than 60 |
|---|---|---|---|
| n | $0 \leq n < Na$ slow down | $Na \leq n < Nb$ predetermined speed | $Nb \leq n$ slow up |

Figure 4:
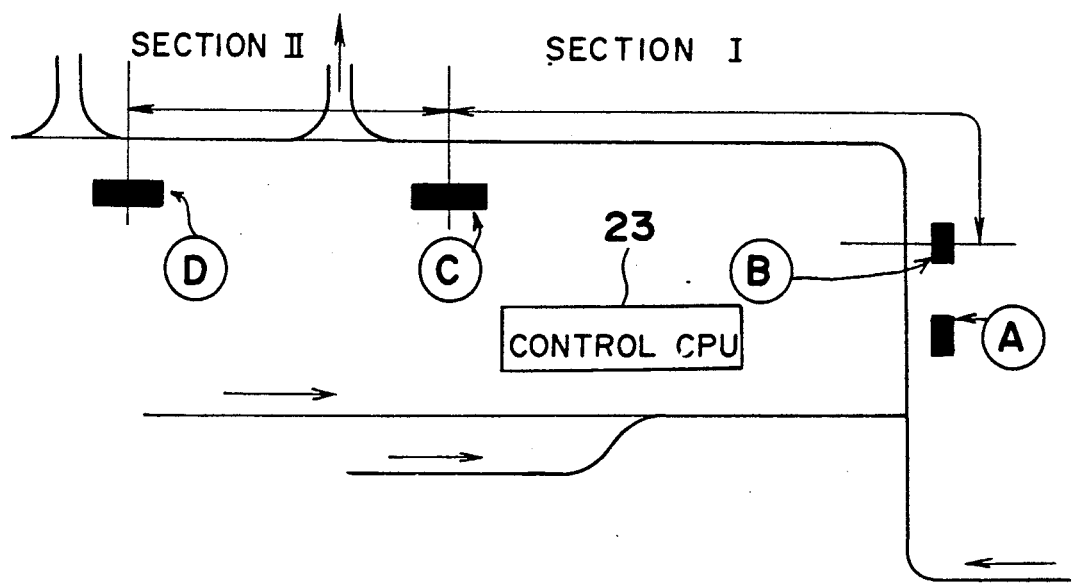
FIG. 4 is a schematic plan view of a predetermined travel path.

The control method for controlling the travel of a plurality of automatic guided vehicles of the above construction along each predetermined path shown in FIG. 4 will be described below.

Three automatic guided vehicles "a", "b", and "c" start from each starting place and travel along each path until they join at a certain place. Then, they travel along a common travel section (I) of the path. Thereafter, only the vehicle "a" is guided to a branch path. Therefore, the vehicle "b" travels at the head along a second section (II) of the path.

Figure 5A:
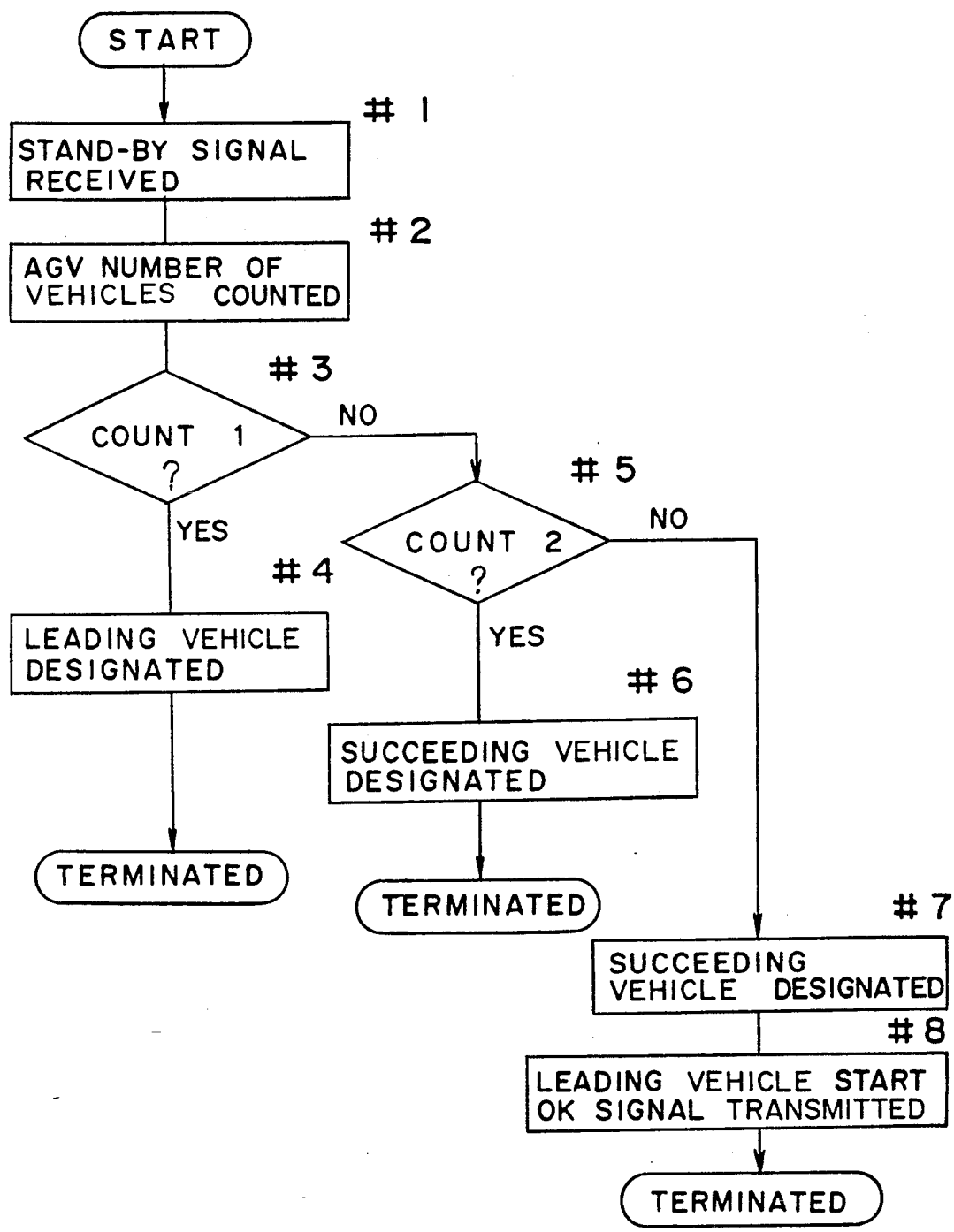
FIG. 5a is a flowchart of the control procedure to be executed by a control CPU when a group is organized.
Figure 5B:
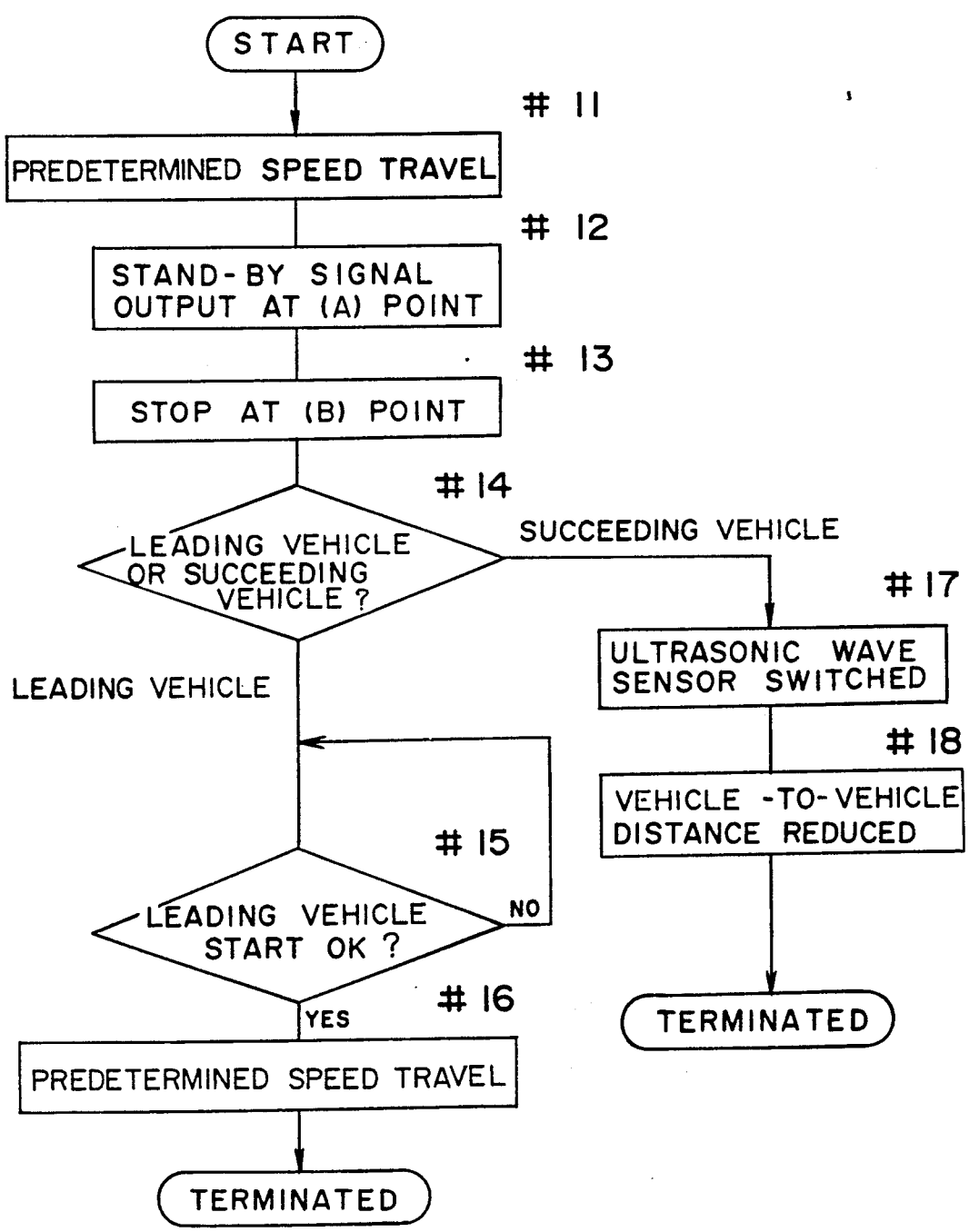
FIG. 5b is a flowchart of the control procedure to be executed by a control section of each automatic guided vehicle when the group is organized.

How a group is organized and how the vehicles start in a group are described with reference to the flowcharts shown in FIGS. 5a and 5b. The flowchart of FIG. 5a shows the procedure executed by the control CPU 23. The flowchart of FIG. 5b shows the procedure executed by the control device of each vehicle "a", "b", and "c". According to the embodiment, the distance between an object and a vehicle will not be allowed to be less than 2 m when the vehicles are not travelling in a group. When the vehicles travel in a group, the distance between adjacent vehicles is controlled to be 40~60 cm.

After the vehicles "a", "b", and "c" pass through a respective path, they travel along the common section of the path of step #11 in FIG. 5(b). When they arrive at a point (A), a stand-by signal is sent from each vehicle to the control CPU 23 at step #12 in FIG. 5(b). Then, when they arrive at a point (B) in this order, they stop travelling at step #13 in FIG. 5(b). In response to the stand-by signals at step #14 in FIG. 5(b), it is decided by the CPU 23 whether or not the vehicle is a leading automatic guided vehicle or a succeeding automatic guided vehicle. That is, referring to FIG. 5(a), the control CPU 23 counts the number of vehicles at step #2 in FIG. 5(a). Then, it is decided by the CPU 23 at step #3 in FIG. 5(a) whether or not the counted numerical value of the vehicle "a" is "1". When the counted numerical value of the vehicle "a" is "1", at step #4 in FIG. 5(a), the vehicle "a" is designated as the vehicle which travels at the head of the group. Then, it is decided by the CPU 23 at step #3 in FIG. 5(a) whether or not the counted numerical value of the vehicle "b" is "1". When the counted numerical value of the vehicle "b" is not "1", it is decided by the CPU 23 at step #5 in FIG. 5(a) whether or not the counted numerical value of the vehicle "b" is "2". When the value thereof is "2" at step #5 therein, the CPU 23 issues an instruction to vehicle "b" to follow vehicle "a" at step #6 in FIG. 5(a) because the counted numerical value thereof is "2". Then, similarly to the method described with respect to vehicle "b", at steps #5 and #7 in FIG. 5(a) vehicle "c" is designated as the vehicle to follow vehicle "b".

Vehicle "a" waits until the CPU 23 transmits thereto a signal indicating a start. The ultrasonic wave sensor 17 of vehicle "b" is switched from the mode for detecting the distance between vehicle "b" and an object to the mode for detecting the distance between vehicle "b" and vehicle "a", and the ultrasonic wave sensor 17 of vehicle "c" is switched from the mode for detecting the distance between vehicle "c" and an object to the mode for detecting the distance between vehicle "b" and vehicle "c". Thus, each vehicle-to-vehicle distance is reduced.

In response to the signal indicating the start, that is, the leading vehicle start OK signal from the CPU 23 at step #8 in FIG. 5(a) and step #15 in FIG. 5(b), vehicle "a" starts first. Thus, the vehicles "a", "b", and "c" travel in a group at a predetermined speed along the first common section I of the travel path at step #16 in FIG. 5(b).

The flowchart of FIG. 6 shows the procedure executed by the control device of vehicle "b" to control the travel of vehicle "b" in the two sections of the path, namely, the first common section I ranging from point (B) to a point (C) at which the first section I branches and the second section II of the path ranging from point (C) to a point (D).

If it is decided that the distance between vehicle "a" and vehicle "b" is (50+10) cm (first predetermined distance) or more in the first section I at step #22, the speed of vehicle "b" is sped up to reduce the distance therebetween at step #23. If it is decided that the distance therebetween is less than (50+10) cm at step #22, and not less than (50-10) cm at step #24, vehicle "b" is kept travelling at the predetermined speed at step #21. If it is decided that the distance therebetween is less than (50-10) cm (another first predetermined distance) at step #24, the speed of vehicle "b" is slowed down to increase the distance therebetween at step #25.

When vehicle "a" arrives at point (C) of the first section I of the common travel path, it proceeds to a branch path according to the program of the vehicle. Thereafter, vehicle "b" travels along the second section II of the travel path at the head at step #26. Therefore, the ultrasonic wave sensor 17 of vehicle "b" is switched from the first mode for detecting the distance between the vehicle "b" and the vehicle "a" to the second mode for detecting the distance between the vehicle "b" and an object at step #17 in FIG. 5(b) and step #27 in FIG. 6. Then, vehicle "b" travels at the predetermined speed at step #28. Vehicle "c" travels so that the distance between vehicles "b" and "c" is reduced at step #18 in FIG. 5(b). If vehicle "b" arrives at the predetermined stop position at step #29, it stops at step #30. Thus, the control device of the vehicle "b" terminates the execution of the control thereof. If vehicle "b" has not arrived at the predetermined stop position at step #29, it is sequentially decided at step #31 whether or not the distance between an object and the vehicle "b" is less than 2 m (second predetermined distance). If the distance therebetween is less than 2 m, the speed of the vehicle "b" is slowed down at step #32. If the distance is not less than 2 m, the program returns to step #28. After the slow down control at step #32, it is sequentially decided at step #33 whether or not the distance between the object and the vehicle "b" is less than 1 m. If the distance therebetween is less than 1 m, the program returns to step #31. After the slow down control at step #34, it is sequentially decided at step #35 whether or not the distance between the object and the vehicle "b" is less than 50 cm. If the distance therebetween is less than 50 cm, the speed of the vehicle "b" stops at step #36 and then the program returns to step #35. If the distance is not less than 50 cm, the program returns to the step #33. That is, vehicle "b" is controlled so that the speed of the vehicle is slowed down until the distance between an obstacle and the vehicle is less than 50 cm and then the vehicle "b" stops.

Thus, if the distance between a person walking across the second section II of the travel path and the vehicle "b" is less than 2 m or 1 m, the speed of the vehicle is slowed down. If the distance therebetween is less than 50 cm, the vehicle "b" stops.

The present invention encompasses modified forms of the above-described embodiment.

For example, each vehicle may be provided with a conventional vehicle-to-object distance detecting means and various numbers thereof may be employed. The distance between the vehicle and an object, the travel paths, and the designated sections of the paths may be appropriately selected as necessary. Further, instead of an optical means, a radio device may be utilized to carry out the communication between the control CPU and the vehicles.

According to the automatic guided vehicle of the present invention, the distance between adjacent vehicles can be reduced. Therefore, the number of vehicles which travel along the entirety of the paths can be increased. An interval can be reliably provided between a vehicle at the back of a preceding group and a vehicle at the head of a succeeding group. Therefore, a person can safely walk across the path of the groups of vehicles.

The control method for controlling the travel of vehicles of the present invention allows a plurality of vehicles to travel in a group or a group to be disorganized depending on a start position and a destination. Therefore, the travel efficiency thereof can be improved.

Although the present invention has been fully described in connection with the preferred embodiments thereof with reference to the accompanying drawings, it is to be noted that various changes and modifications will become apparent to those skilled in the art. Such changes and modifications are to be understood as included within the scope of the present invention as defined by the appended claims unless they depart therefrom.

What is claimed is:

1. An automatic guided vehicle comprising:
  a vehicle body;
  driving means mounted on the vehicle body for driving the vehicle at variable speeds;
  detecting means for detecting the distance between the vehicle and an object and outputting a signal indicative of said distance; and
  control means operatively connected to said detecting means and to said driving means for receiving said signal from said detecting means, and for selectively operating under a first mode in which said driving means is controlled by the control means to both slow down the vehicle when the signal output by said detecting means is indicative of the detected distance being less than a first mode predetermined distance and to speed up the vehicle when the signal is indicative of the detected distance being greater than a first mode predetermined distance and a second mode in which said driving means is controlled to slow down the speed of the vehicle as long as the signal output by said detecting means is indicative of said distance being less than a second mode predetermined distance greater than each said first mode predetermined distance, whereby a group of the vehicles will travel closer together when said control means is operating in said first mode than when said control means is operating in said second mode.

2. A method for controlling the travel of an automatic guided vehicle along a path, said method comprising the steps of:

detecting the distance between the vehicle and a vehicle immediately downstream therefrom along a common travel path as the vehicles travel along said common travel path;

controlling the vehicle to maintain a first predetermined distance from the vehicle immediately downstream thereof along a first predetermined section of said common travel path based on the distance detected therebetween, and controlling the vehicle to maintain at least a second predetermined distance, that is larger than said first predetermined distance, from the vehicle immediately downstream thereof along a second predetermined section of said common travel path downstream of said first section based on the distance detected therebetween, whereby a group of the vehicles will travel closer together along said first predetermined section of said common travel path than along said second predetermined section of said common travel path.

* * * * *